July 7, 1953          O. E. LEWIS          2,644,597
DOLLY FOR HANDLING SINGLE AND DUAL TRUCK WHEELS
Filed Jan. 13, 1951          2 Sheets-Sheet 1
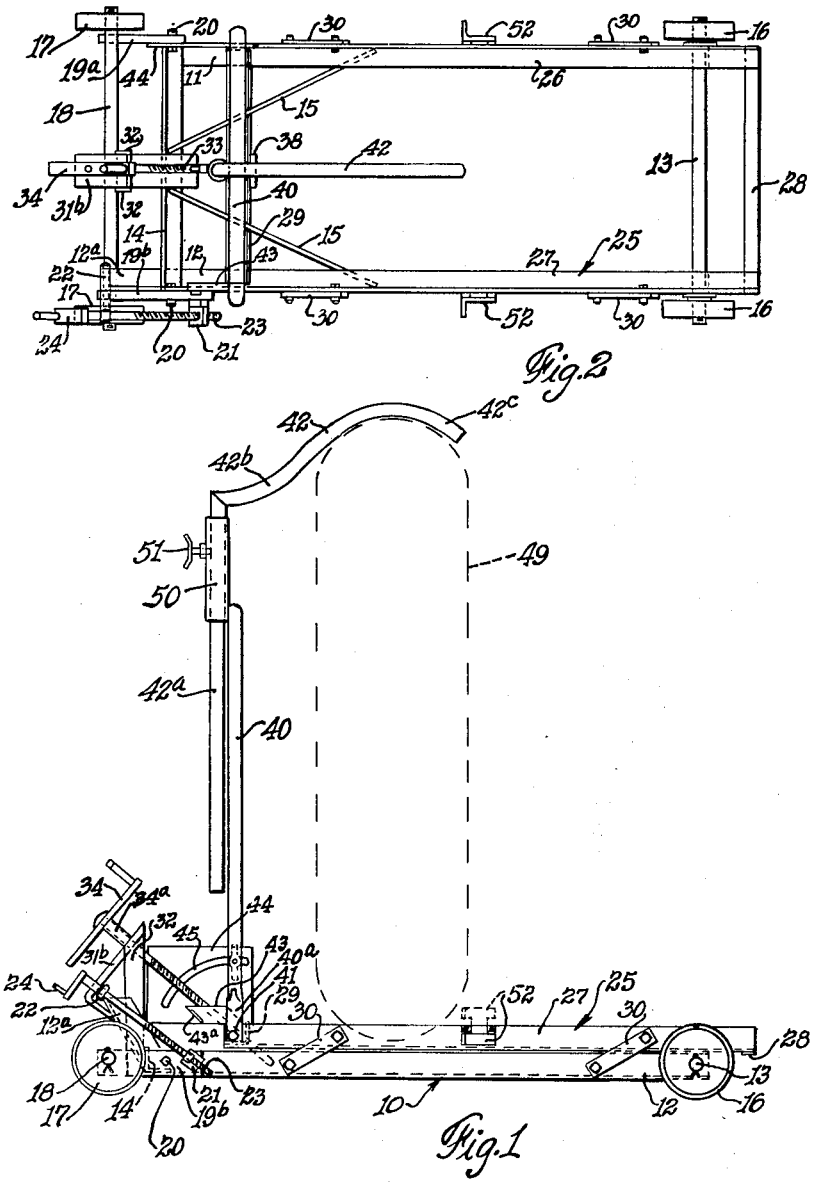
INVENTOR
Orrin E. Lewis
By Frank J. Schraeder Jr.
attorney July 7, 1953  O. E. LEWIS  2,644,597
DOLLY FOR HANDLING SINGLE AND DUAL TRUCK WHEELS
Filed Jan. 13, 1951  2 Sheets-Sheet 2
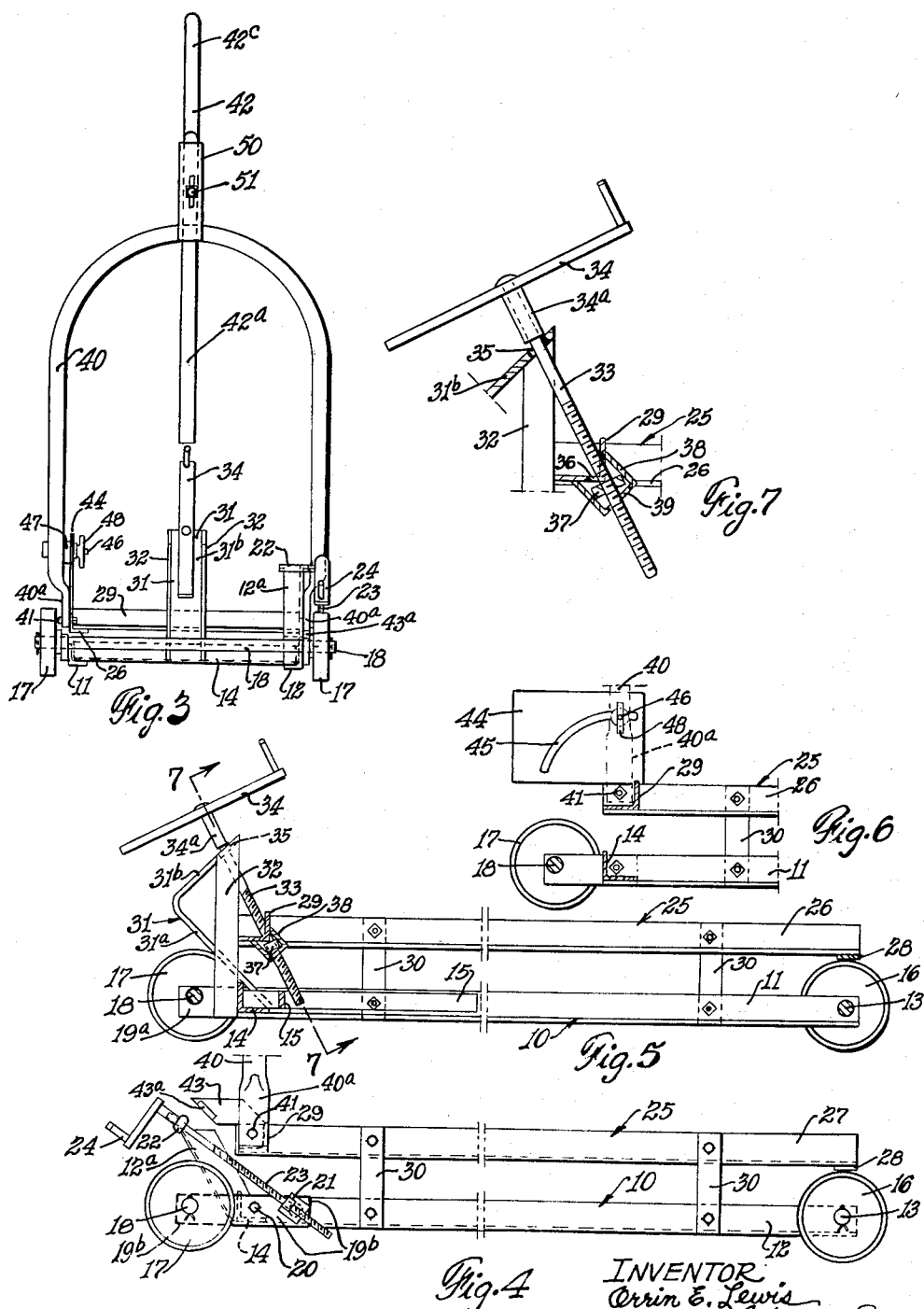
INVENTOR
Orrin E. Lewis
BY Frank Schraeder
Attorney Patented July 7, 1953

2,644,597

UNITED STATES PATENT OFFICE 2,644,597

DOLLY FOR HANDLING SINGLE AND DUAL TRUCK WHEELS

Orrin E. Lewis, Belleville, Kans.

Application January 13, 1951, Serial No. 205,873

6 Claims. (Cl. 214—331)

This invention relates to a new, useful and improved dolly for facilitating the removal and replacement of heavy single or dual wheels respectively from and onto the axle of a service vehicle such as a motor truck, motor bus or a farm or industrial tractor; such wheels being commonly equipped with large and comparatively heavy pneumatic tires which render same cumbersome and exceedingly difficult to handle.

One of the objects of my invention is to provide a simple and durable dolly which will materially aid a service worker in the handling of heavy vehicle wheels when removing and replacing same during servicing operations such as grease packing bearings, replacing grease seals, repairing tires, and servicing brakes; the accomplishment of such servicing operations being performed with comparatively greatly reduced physical effort and with a saving of considerable time.

An object of the invention is to provide a dolly which can be fabricated from comparatively light-weight structural plate and angle iron material at low cost.

Another object of the invention is found in the provision of a dolly composed of a wheel-supported base frame and a motor vehicle wheel or load-engaging frame superimposed in pivotal arrangement upon and independently movable relatively to but in constant parallelism with the base frame; the base and load-engaging frames being simultaneously tiltable by novel micrometric mechanism about a pair of the front wheels of the base frame and the load-engaging frame being operable to selectively adjusted elevations above the base frame by novel micrometric mechanism carried on the base frame and operatively connected with the load-engaging frame.

The various features of novelty whereby the present invention is characterized will hereinafter be pointed out with particularly in the claims, but, for a full understanding of the invention and of its objects and advantages, reference may be had to the following detailed description taken in connection with the accompanying drawings.

In the accompanying drawings:

Fig. 1 is a side elevation of a wheel servicing dolly embodying my invention;

Fig. 2 is a plan view of the dolly;

Fig. 3 is an end view of the dolly;

Fig. 4 is a slightly enlarged side elevation of the wheel-engaging and base frames showing the dolly tilting means;

Fig. 5 is a slightly enlarged longitudinal section showing the means for elevating the wheel-engaging frame;

Fig. 6 is a slightly enlarged longitudinal section showing the means for securing the handle in angularly adjusted position; and Fig. 7 is a section taken on line 7—7 of Fig. 5 showing the mechanism for elevating the wheel-engaging or load-engaging frame.

In the drawings, the dolly is shown in preferred construction as comprising a base frame 10 consisting of a pair of laterally spaced longitudinally extending side angle irons 11 and 12. At the rear ends, the angle irons 11 and 12 are braced by an axle 13 which extends through the vertical legs thereof and is welded or otherwise secured to same to rigidly reenforce that end of the base frame. Near the front ends, the side angle irons are braced by a suitable transverse angle iron 14 the lateral leg of which extends over the lateral legs of the side angle irons and is welded to same to rigidly reenforce the front end of the base frame 10.

The base frame 10 is also reenforced by angularly disposed bars 15 which are welded to and extend from the angle iron 14 to the side angle irons 11 and 12.

Suitable supporting rear wheels or rollers 16 are rotatably mounted upon the outer ends of axle 13. The two front wheels or rollers 17 are rotatably mounted on the outer ends of axle 18 which extends through the front ends of a pair of arms 19ª and 19ᵇ which are pivotally mounted on bolts 20 that are carried on the front ends of the vertical legs of the side angle irons 11 and 12.

The arm 19ᵇ extends rearwardly beyond the pivot bolt 20 to receive thereon a transversely threaded nut 21 which is pivotally mounted on the rearwardly extending portion of the arm 19ᵇ.

The side angle iron 12 is formed with a forwardly upwardly angularly disposed integral extension 12ª which carries at its outer end a rotatably mounted bracket sleeve 22 for rotatably supporting therein the outer end of an elongated screw 23 the inner end portion of which has threaded connection with the nut 21 and the outer end of which is provided with an operating crank 24 suitably secured thereto.

It will now be apparent that micrometric means or mechanism for tilting the front end of the dolly is provided in the mounting of the front wheels 17 and their supporting axle 18 in the outer ends of the pivoted arms 19ª and 19ᵇ so that when the screw 23 is rotated by the crank 24 in one direction the front end of the dolly will be raised while a reverse rotation of the screw crank 24 will lower the front end of the dolly. The advantage of this tilting feature will be explained fully in connection with the description of operation of the dolly.

A vertically movable load-engaging frame 25 is pivotally supported on and above the base frame 10 and consists of a pair of laterally spaced longitudinally extending load-engaging angle irons 26 and 27 which are reenforced at their rear ends for rigidity of the frame 25 by a transverse angle iron 28 which is welded or otherwise secured to the bottom faces of the lateral legs of angle irons 26 and 27.

The front ends of the angle irons 26 and 27 are reenforced for rigidity of the frame 25 by a transverse angle iron 29 the lateral leg of which rests on the lateral legs of the angle irons 26 and 27 and is welded or otherwise secured thereto.

Four pivot arms or links 30 all of equal length, two on each side of the dolly and each having one end pivotally connected to the side angle iron of the base frame 10 and the opposite end pivotally connected to the side angle iron of the load-engaging frame 25 support the frame 25 for vertical movement in an arcuate path relatively to the base frame 10.

The load-engaging frame 25 is adapted to be placed under a load, such as a single or dual wheel of a motor truck or any other portable article, to the load onto, and for transport by, the dolly when the vertically adjustable frame 25 is placed under the load and then elevated, by the herein provided mechanism, during its upward and forward pivotal arcuate movement on its supporting pivot arms 30.

The operating mechanism and its structural support for actuating the load-engaging frame 25 into selectively vertically adjusted elevated positions includes a support consisting of an angularly bent flat bar 31 disposed on the longitudinal center-line of the dolly and having the lower end thereof welded or otherwise secured to the lateral leg of the transverse angle iron 14 and its upper opposite end disposed between and welded or otherwise secured to a pair of vertically disposed bars 32 having their lower edge portions welded or otherwise secured to the upstanding leg of angle iron 14. The angularly bent bar 31 may be described as having its lower leg portion 31ª disposed angularly upwardly and forwardly from its lower end connection with the transverse angle iron 14 and its integral upper leg portion 31ᵇ disposed angularly rearwardly and upwardly for embracement by and between the upper ends of the two vertically disposed supporting bars 32.

To raise and lower the load-engaging frame 25, a micrometric mechanism is provided which consists of an elongated screw 33 having a crank 34 affixed to its upper outer end.

An unthreaded upper or outer shank portion of the screw 33 extends from the relatively diametrically enlarged crank portion 34ª through an elongated opening 35 near the outer end of the leg portion 31ᵇ for rotatable support thereon. The lower or inner threaded end portion of the screw 33 extends through an elongated opening 36 in the transverse angle iron 29 into threaded connection with a nut 37 which is loosely but non-rotatably mounted within a U-shaped yoke 38 having the edges of its open end welded or otherwise secured to the angle iron 29; the terminal portion of the screw 33 projecting through an elongated opening 39 in the yoke 38.

A rotation of the crank 34 in one direction will cause the non-rotatable nut 37 to travel upwardly on screw 33 and thus, through its engagement with the yoke 38, will cause an upwardly movement of the load-carrying frame 25 as it moves through an arcuate path while supported on the pivoted arms 30. A reverse rotation of the crank 34 will cause the non-rotatable nut 37 to travel downwardly on screw 33 to thereby lower the load-carrying frame 25.

It will readily be apparent from the lowered position of the load-carrying frame as shown in Fig. 1 and from the raised position thereof shown in Fig. 5, that because the pivotal points of the arms 30 have fixed pivotal connections with the sides of the base frame 10 and load-carrying frame 25, the longitudinal axis of the screw 33 will assume varying angular positions, within an arc having a center near the opening 35, during the up and down movements of the load-carrying frame 25 and for this reason the openings 35, 36 and 39 are elongated longitudinally of the dolly in respectively the supporting leg 31ᵇ, angle iron 29, and yoke 38.

My improved dolly also includes an inverted U-shaped handle 40 which is pivotally connected by bolts 41 to the front end of the dolly and preferably to the front ends of angle irons 26 and 27 of the load-engaging frame 25.

The handle 40 functions as means for manually towing the dolly and as a support for an adjustable wheel holder generally designated by numeral 42.

The lower ends of the handle 40 are preferably slightly flattened at their pivotal portions, as at 40ª, and to stabilize the handle, when in forwardly tilted position while towing the dolly, I provide an abutment 43 in the form of a short clip angle iron which is welded or otherwise secured to the end edge portion of the upstanding leg of the angle iron 27; one end of the handle being adapted to engage the angularly disposed leg 43ª of the abutment 43.

The tiltable handle 40 is provided with means for securing it in desired vertical or inclined position consisting of an upstanding plate 44 which is welded or otherwise secured preferably to the upper edge of the vertical leg of angle iron 26. A segmental slot 45 plate 44 receives therethrough a bolt 46 which extends through one leg of the handle 40, through a spacer washer 47 and through slot 45 into threaded engagement with a wing nut 48, which nut 48 when tightened will hold the handle in vertical or inclined position.

The adjustable wheel holder 42 consists of a cylindrical rod or pipe of straight section 42ª terminating at its upper end in a curved section 42ᵇ having terminal portion 42ᶜ adapted to engage the top portion of the tire of a motor vehicle wheel shown in broken lines and designated by numeral 49.

The straight portion 42ª of the wheel holder 42 is adjustably slidably mounted in a tubular sleeve 50 which is carried on the upper portion of the handle 40 and a suitable set screw 51 retains the holder 42 in the desired vertically adjusted position.

In handling a vehicle wheel during its removal from or replacement onto the vehicle axle, the curved end 42ᶜ of the holder is frictionally engaged over the upper portion of the tire of the wheel to thus stabilize same and hold it in place on the load-engaging frame 25. In handling a dual wheel the holder engages the tire of the outer wheel.

In the operation of my dolly for removing a wheel from the axle of the motor vehicle, the desired wheel is first elevated off the ground by the use of a jack placed under the wheel axle, whereupon, the dolly is rolled under the wheel to be serviced with the load-engaging frame 25 lowered in the position shown in Fig. 1; the longitudinal center-line of the dolly being substantially aligned with the axis of the wheel with the rear end of the dolly pushed under the elevated wheel until the wheel occupies an approximate position relatively to the dolly as shown in Fig. 1.

With the top of the tire 49 securely engaged by the wheel holder 42, the crank 34 is then rotated to cause an upward movement of the wheel or load-engaging frame 25 to sufficiently lift the wheel and transfer its load onto the dolly and, with all wheel securing means free, the dolly together with the wheel may then be moved forwardly to remove the wheel off the vehicle axle by grasping the handle 40 or by pulling on the tire to cause the dolly to roll outwardly from the vehicle.

In the event the motor vehicle axle should be elevated by the jack with its longitudinal axis disposed at a slight angle from the horizontal, or in the event the service room floor be not horizontal or level where occupied by the dolly, the obvious resistance to the removal of the wheel may readily be overcome by novel provision of the micrometric means for tilting the dolly about the axis of its front wheels 17 so as to align the longitudinal axis of the wheel-engaging frame 25 with that of the vehicle axle by rotation of the crank 24, whereupon, any slight binding caused by misalignment having been obviated, the wheel may be removed with comparative ease.

After serving the wheel or axle, the wheel may then, while on the dolly, be readily replaced upon the vehicle axle.

The construction shown in the drawing is obviously capable of modification and such modification as is is within the scope of the appended claims I consider to be within the spirit of my invention.

I claim:

1. A dolly comprising a base frame including a pair of supporting wheels at the front and rear ends thereof, the front pair of said wheels being mounted on pivotal means carried on the front end of said base frame; a vertically movable load-engaging frame pivotally supported on and above said base frame including laterally spaced plane-aligned side members; a support carried on the front end of said base frame; mechanism for raising and lowering said load-engaging frame comprising a screw bodily movable angularly within an arc and rotatably carried on said support, a yoke carried on said load-engaging frame, a nut bodily shiftable relatively to said load-engaging frame loosely carried in said yoke and in threaded connection with said screw; and manually operable means carried entirely on said base frame for actuating said pivotal means to thereby tilt the dolly about the axis of the front pair of said wheels.

2. A dolly as set forth in claim 1 wherein the front pair of said wheels are rotatably mounted on a common axle, and wherein said pivotal dolly tilting means carried on said base frame consists of a pair of arms carrying at corresponding front ends thereof said axle and being pivotally mounted on the front end of said base frame, one of said arms extending rearwardly beyond its pivot, and wherein said manually operable means consists of a nut pivotally carried on said one arm, an elongated dolly tilting screw having an inner end portion in threaded connection with said nut, a sleeve rotatably carried on said base frame for supporting the outer end of said dolly tilting screw, and a manually operable crank on the outer end of said dolly tilting screw.

3. A dolly for facilitating the removal of the wheels of a motor vehicle, comprising a base frame movable on a plurality of supporting wheels, a vehicle wheel-engaging frame supported pivotally on and above said base frame including laterally spaced horizontally plane aligned longitudinally extending side members adapted to be interposed under the vehicle wheel, when the latter is in elevated position, with said spaced side members extending parallely to the axis of the vehicle wheel, a support carried on the front end of said base frame, a screw-actuated mechanism for raising and lowering said wheel-engaging frame carried partly on said wheel-engaging frame and partly on said support and including a nut operatively associated with said screw and loosely connected with but movable relatively to said wheel-engaging frame, and means on the front end of said base frame adapted for concurrently tilting both of said frames about the axis of one of said pairs of wheels.

4. A dolly for facilitating the removal of a single or dual wheel of a motor vehicle for servicing, comprising a base frame including a pair of supporting wheels therefore mounted thereon at the front and rear ends thereof, the front pair of said wheels being rotatably carried on a common axle carried on the front ends of a pair of arms pivotally mounted on the front end of said base frame, one of said arms extending rearwardly beyond its pivot to provide an extension of that arm for pivotally supporting thereon a nut, an elongated screw having a threaded inner end portion in threaded connection with said nut, a bracket rotatably carried on said base frame for supporting thereon the outer end of said screw, a crank on the outer end of said elongated screw for rotating said screw to tilt the dolly about said pair of front wheels, a vertically movable vehicle-wheel-engaging frame supported pivotally on and above said base frame, link arms on opposite sides of the dolly each having one corresponding end pivotally connected to said base frame and the opposite end connected to said wheel-engaging frame, a support carried on the front end of said base member, mechanism for raising and lowering said wheel-engaging frame consisting of an elongated screw rotatably carried on said support having a crank connected to its outer end and a threaded inner end portion, a yoke affixed to said wheel-engaging frame, a threaded nut loosely carried in said yoke in threaded engagement with second-named screw, said second-named screw having a shank portion extending through an opening in said support which opening is elongated longitudinally of the dolly, said threaded inner portion of said second-named screw extending through said loosely carried nut and through an opening in said yoke which is elongated longitudinally of the dolly whereby said second-named screw and loose nut are permissibly movable in varying positions angularly relatively to said wheel-engaging frame during the vertical movements of said wheel-engaging frame in an arcuate path while carried on said link arms, and a crank for rotating said second-named screw.

5. A dolly comprising a laterally extending base frame including a pair of supporting wheels at the front and rear ends thereof; a vertically movable load-engaging frame including laterally spaced plane-aligned longitudinally extending load-engaging members supported on said base frame on at least two pairs of link arms all of equal length; and mechanism for raising and lowering said load-engaging frame, while said load-engaging members are constantly maintained in parallelism with said base frame, comprising a screw rotatably carried on said base frame and bodily movable angularly within an arc, a bodily movable nut carried on said load-engaging members in constantly threaded connection with said screw during the rotation and angular movements of said screw; and manually operable means carried on said base frame adapted for adjustably simultaneously tilting both of said frames about the axis of the front pair of said wheels and thereafter maintaining the adjusted tilted position and parallelism of said frames during subsequent raising or lowering of said load-engaging frame.

6. A dolly of the kind described comprising a laterally extending base frame including a pair of supporting wheels at the front and rear ends thereof; a vertically movable vehicle-wheel-engaging frame pivotally supported on said base frame on longitudinally spaced link arms of equal length having opposite ends pivotally connected to said vehicle-wheel-engaging frame and to said base frame; mechanism for adjustably raising and lowering said vehicle-wheel-engaging frame during its constantly maintained parallelism with said base frame, said mechanism being adapted to automatically retain said vehicle-wheel-engaging frame in adjusted elevated or lowered position; and manually operable means carried on said base frame adapted for adjustably simultaneously tilting both of said frames about the axis of the front pair of said wheels and thereafter maintaining automatically the adjusted tilted position and parallelism of said frames during subsequent raising or lowering of said vehicle-wheel-engaging frame.

ORRIN E. LEWIS.

References Cited in the file of this patent

UNITED STATES PATENTS

| Number | Name | Date |
|---|---|---|
| 1,171,807 | Siberell | Feb. 15, 1916 |
| 1,378,582 | Chipps | May 17, 1921 |
| 2,379,587 | Moore | July 3, 1945 |
| 2,410,902 | Roberts | Nov. 12, 1946 |

FOREIGN PATENTS

| Number | Country | Date |
|---|---|---|
| 417,300 | Germany | Aug. 20, 1925 |